Jan. 13, 1970  W. R. WILLIAMSON  3,489,650
MODULAR UNIT ASSEMBLY FOR MULTI-STAGE FLASH DISTILLATION
Filed Feb. 13, 1967  4 Sheets-Sheet 1
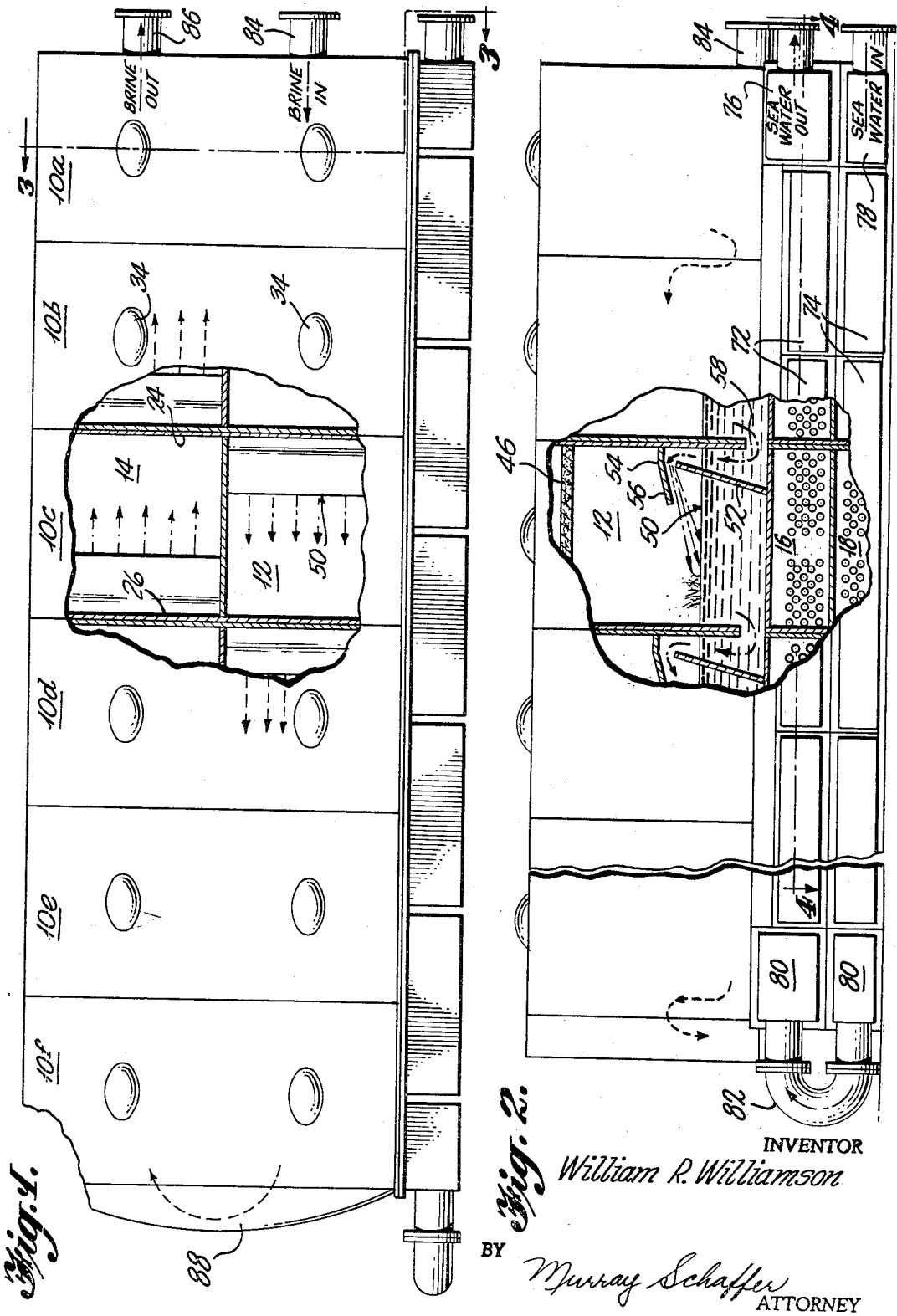
INVENTOR
William R. Williamson
BY
Murray Schaffer
ATTORNEY INVENTOR
William R. Williamson
BY
Murray Schaffer
ATTORNEY

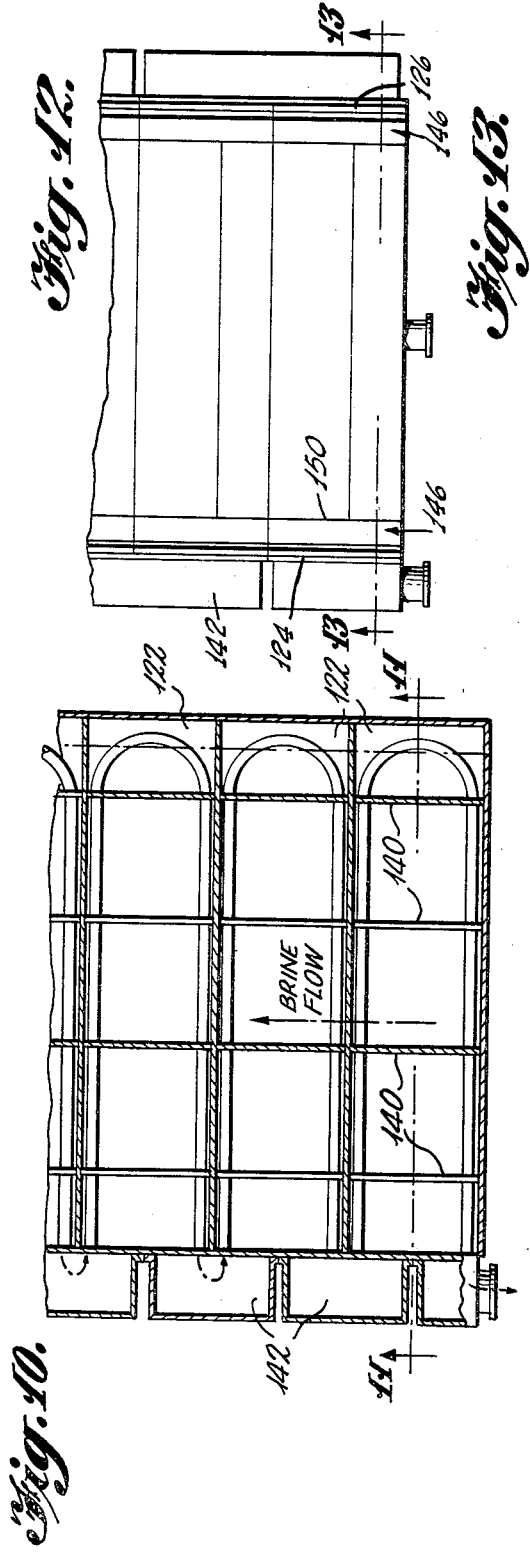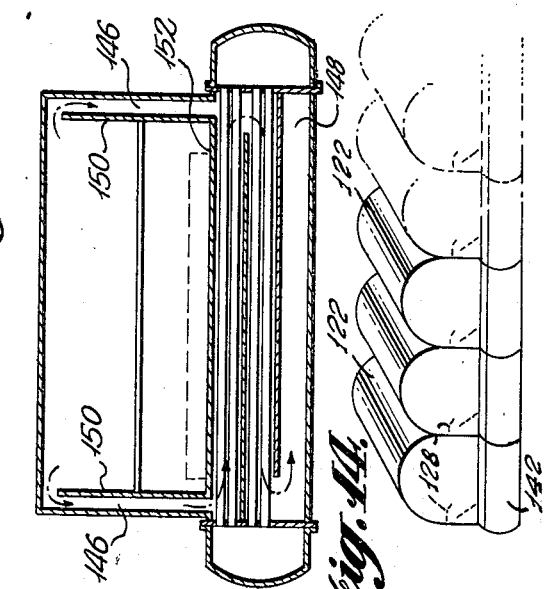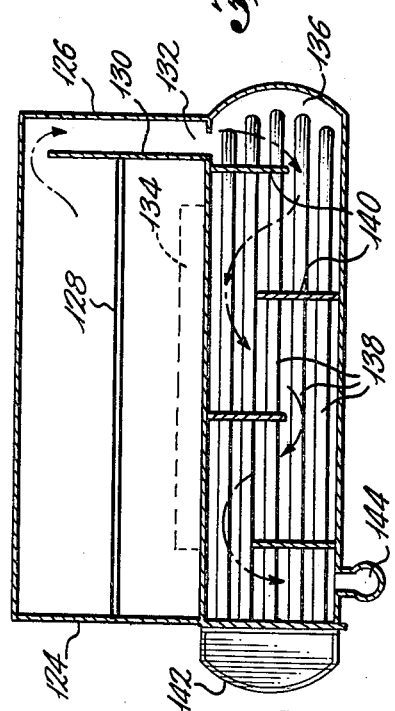

Jan. 13, 1970 W. R. WILLIAMSON 3,489,650
MODULAR UNIT ASSEMBLY FOR MULTI-STAGE FLASH DISTILLATION
Filed Feb. 13, 1967 4 Sheets-Sheet 4
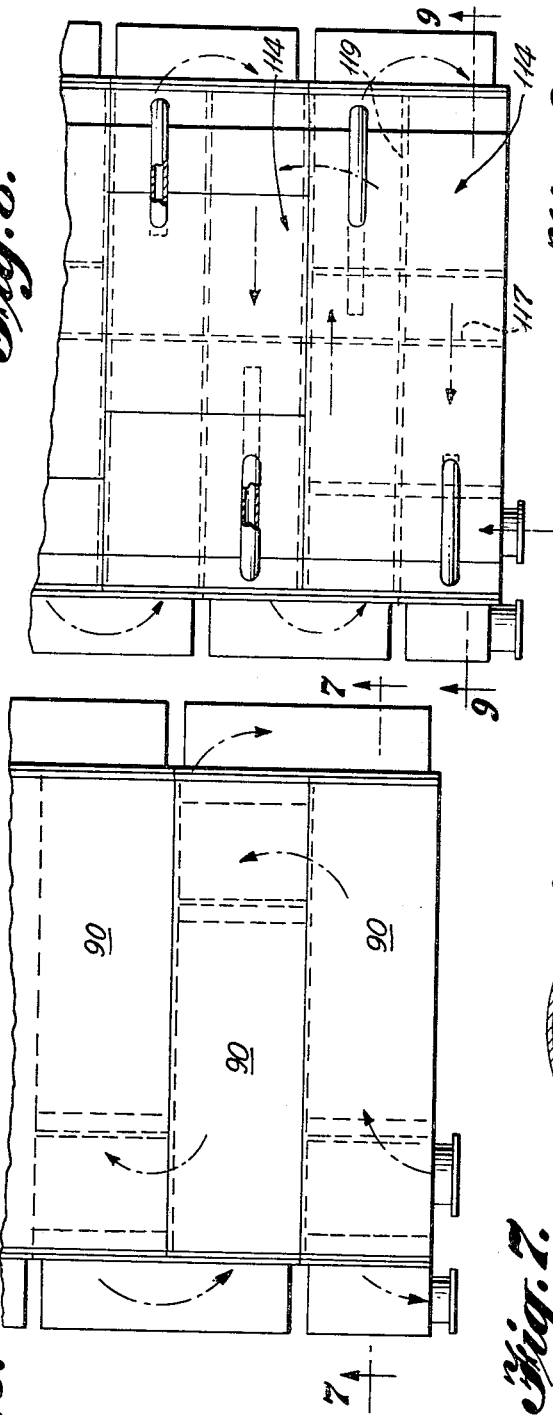
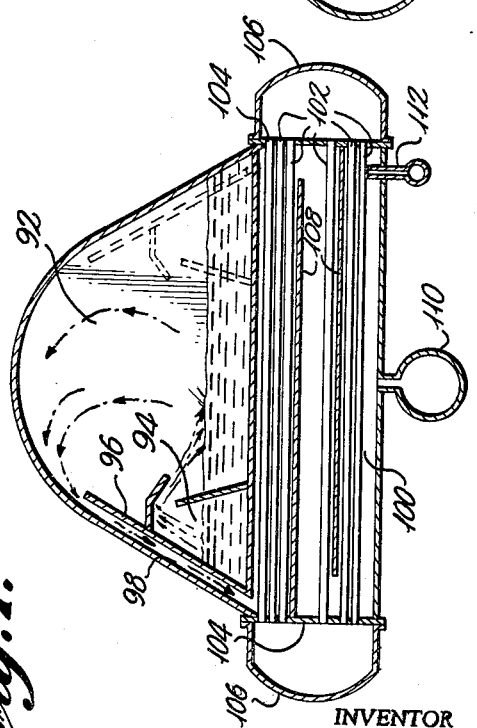
INVENTOR
William R. Williamson
BY Murray Schaffer
ATTORNEY

United States Patent Office 3,489,650
Patented Jan. 13, 1970

3,489,650
MODULAR UNIT ASSEMBLY FOR MULTI-STAGE FLASH DISTILLATION
William Rodger Williamson, Waterford, Conn., assignor to American Machine & Foundry Company, a corporation of New Jersey
Filed Feb. 13, 1967, Ser. No. 615,572
Int. Cl. C02b 1/06; B01d 3/06, 3/02
U.S. Cl. 202—173   8 Claims

ABSTRACT OF THE DISCLOSURE

This disclosure includes drawings and descriptions of various forms of modular units for assembly into multi-stage flash distillation plants. Each such module is essentially self-contained and includes an upper evaporating space establishing one or more flash chambers, a lower condenser space, and duct means interconnecting the respective flash chambers and condenser chambers of each stage. The units are constructed to permit heated feed to be passed in counter-flow to relatively cool condensing fluid in each stage.

---

Figure 3:
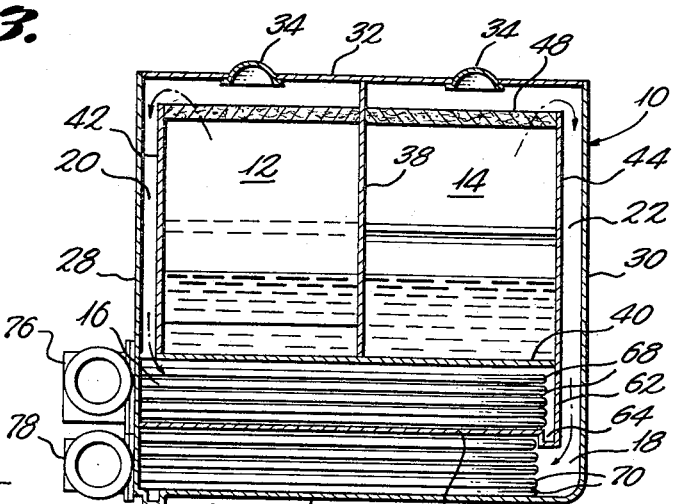

This invention relates to flash distillation plants, and more particularly, it concerns a novel modular construction by which self-contained evaporator-condenser modules may be connected in tandem to provide any number of separate stages that may be required in a particular flash distillation plant.

Multi-stage flash distillation apparatus of the type used for sea water desalination usually involves large, plant-type installations which present problems both from the standpoint of construction and handling. Also, it is often necessary after such plants have been installed to increase their capacity by adding further evaporator-condenser stages. For these reasons, among others, it has been recognized as desirable to modularize various components of the plant to provide shop fabricated modules which can be readily handled and transported to remote sites of operation for assembly to provide at least part of an operable plant. Moreover, the use of modular constructions enables a degree of versatility in the design of plants since the operating capacity of such plants are dependent in part on the number of flash evaporation stages employed. While modular constructions have, therefore, been used with some success in the field of sea water desalination, they have entailed a measure of compromise with respect to peak operating efficiency. For example, either such operating characteristics as thermal balance, water-vapor separation, and the amount of structural material needed to provide strength in the modules, have been sacrificed in the past in the interest of the desirable characteristics of modular construction; or, the degree of modularization has been curtailed in the interest of achieving optimum operating characteristics.

In accordance with the present invention, a multi-stage flash distillation plant is formed by interconnected modules, each of which include at least one flash chamber, a corresponding number of condenser chambers, and conduit or duct means for interconnecting the flash chamber and the condenser chamber. Although the modules may take a variety of different structural forms, generally they are designed and constructed so as to enable the passage of heated brine through successive flash chambers in counter-flow relation with the passage of relatively cool condensing fluid through heat exchange elements in the respectively successive condenser chambers. Also, the relatively heavy condenser chamber in the basic modular construction is positioned below and supports the structure defining the flash chamber, thereby reducing the amount of material needed to provide strength from a purely structural standpoint. Certain forms of the invention enable further reduction in cost by isolating corrosive feed solutions, such as brine, to contact with wall components that do not supply strength required to resist pressure differentials developed during low temperature operation of a distillation plant in which the modules are used.

Among the objects of the present invention, therefore, are: the provision of a substantially self-contained modular unit for multi-stage flash distillation plants; the provision of such a modular unit which is easily connected to other similar modules to establish a plant having any desired number of separate stages; the provision of a modular unit of the type referred to which is economical from the standpoint of minimizing both the amount of structural materials needed to render the unit self-supporting and the amount of high cost materials needed to resist corrosion; the provision of a flash distillation plant construction that is highly efficient in water vapor separation and in the achievement of thermal balance; and the provision of an integrated flash chamber-condenser section module design that is adaptable to various shapes and sizes that may be required for a particular installation.

Figure 4:
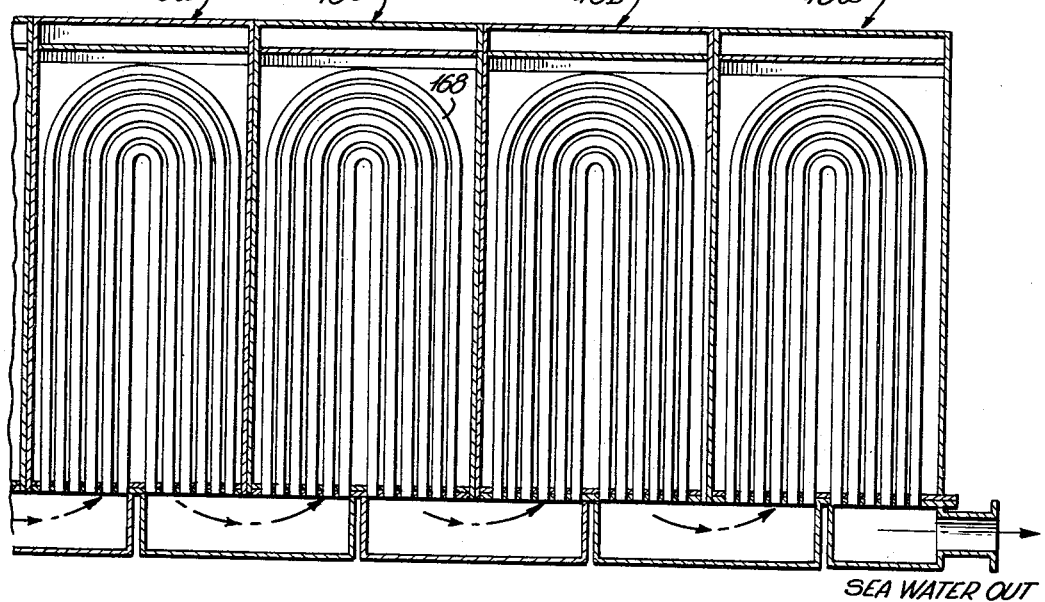
Figure 5:
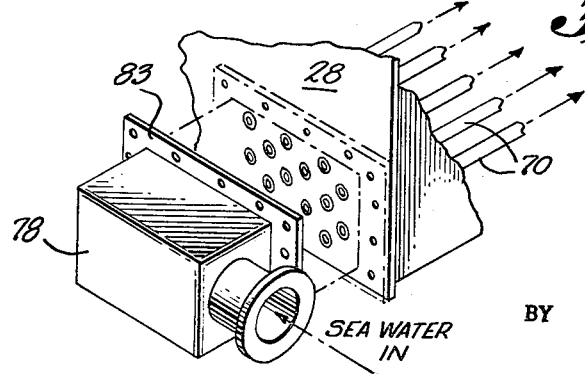

Other objects and further scope of applicability of the present invention will become apparent from the detailed description given hereinafter, taken in conjunction with the accompanying drawings in which:

FIG. 1 is a fragmentary plan view in partial section illustrating one form of the present invention; FIG. 2 is a fragmentary side elevation in partial cross-section of the embodiment of FIG. 1; FIG. 3 is a cross-section taken on line 3—3 of FIG. 1; FIG. 4 is a cross-section taken on line 4—4 of FIG. 2; FIG. 5 is an enlarged, exploded fragmentary perspective view illustrating a construction detail of the embodiment of FIG. 1; FIG. 6 is a fragmentary plan view illustrating an alternative embodiment of the present invention; FIG. 7 is a cross-section taken on line 7—7 of FIG. 6; FIG. 8 is a fragmentary plan view illustrating another modified form of the present invention; FIG. 9 is a cross-section taken on line 9—9 of FIG. 8; FIG. 10 is a fragmentary cross-section illustrating a condenser arrangement for the flash distillation modules of this invention; FIG. 11 is a cross-section taken on line 11—11 of FIG. 10; FIG. 12 is a fragmentary plan view of still another embodiment of this invention; FIG. 13 is a cross-section taken on line 13—13 of FIG. 12; and FIG. 14 is a fragmentary perspective view of the embodiment of FIG. 12.

In FIGS. 1–5 of the drawings, a twelve stage flash plant is shown incorporating six substantially identical modules 10a–f, each having a pair of flash chambers 12 and 14 and a pair of condenser chambers 16 and 18. Also, and as shown particularly in FIG. 3 of the drawings, the flash chamber 12 communicates with the condenser chamber 16 by way of a vapor duct 20 while the flash chamber 14 in each module communicates with the condenser chamber 18 through a vapor duct 22.

To establish the interconnected flash chambers and condenser chambers above mentioned, each module is provided with a front wall 24 and a rear wall 26 across the ends of a peripheral shell formed by exterior sidewalls 28 and 30, a top wall 32 having access hatches 34, and an exterior bottom wall or base 36 which may be fitted with pedestals or other suitable supporting means (not shown). Although independent front and rear walls 24 and 26 close the ends of the peripheral shell in each module 10 of FIGS. 1–5, it is contemplated that in some instances, the enclosures defined by these walls may be formed by single walls to the front or to the rear of each module. In this manner, the various chambers established by the walls would be open at one end prior to assembly with another module. After the assembly, however, it will be appreciated that the chambers would be completely established by the single wall of the next adjacent module.

The interior of each module is divided longitudinally by a central wall 38 extending between the end walls 24 and 26 and between the top wall 32 and a flash chamber floor 40. Also, a pair of flash chamber sidewalls 42 and 44 extend between the end walls 24 and 26 and are spaced from the exterior sidewalls 28 and 30, respectively, to establish the ducts 20 and 22. As shown in FIG. 3, the upper ends of the walls 42 and 44 are spaced from the top wall 32 to enable fluid communication between the flash chambers 12 and 14 and the ducts, 20 and 22, respectively. A pair of demister screens or separators 46 and 48 are positioned between the walls 42 and 44 and the central wall 38 to assure that only vapors pass through the ducts to the condenser chambers.

In each of the flash chambers 12 and 14 of each module 10a–f, an evaginated venturi nozzle, generally designated by the reference numeral 50, is provided. For reasons which will be explained more fully below, the nozzles 50 in the respective flash chambers 12 and 14 are positioned adjacent to the front wall 24 in the flash chambers 12 and adjacent to the rear wall 26 in flash chamber 14, as shown most clearly in FIG. 1 of the drawings. Structurally, each of the nozzles includes an inclined rear plate 52 and a top plate 54 having a downwardly inclined lip 56, the top plate 54 being affixed on the end wall to which the particular nozzle is positioned adjacently, and being spaced above the upper edge of the rear plate 52. Also, an aperture 58, positioned near the flash chamber floor 40, is provided so that brine may be introduced into each nozzle 50 near the bottom thereof. The nozzles 50 are preferably designed within certain critical limits. For example, the plates 52 and the wall 24 as shown in FIG. 2 of the drawings, should form an angle of between 7° and 25°. Also, the distance between the upper edge of the rear plate 52 and the wall 24, in the case of the flash chamber 12, should be substantially the same as the distance between the upper edge of the rear plate and the top plate 54. In addition, the lip 56 should form an angle between 7° and 30° with the plate 52 so that the lip 56 may be inclined from the vertical between 14° and 55° depending on the particular angle of the plate 52.

The construction of the condenser chambers 16 and 18 is illustrated most clearly in FIGS. 2–4 of the drawings. As shown, the two chambers 16 and 18 are isolated from each other by a horizontal division plate 60 in each module which extends between the front and rear walls 24 and 26, and between the exterior sidewall 28, and a downwardly extending portion 62 of the interior sidewall 44. A distillate trough 64 is formed at the juncture of the walls 60 and 62. A similar distillate trough 66 is provided in the lower condenser chamber 18. A plurality of heat exchange elements in the form of U-shaped tubes 68 are located in the upper condenser chamber 16 and a plurality of similar tubes 70 are arranged in the lower condenser chamber 18. The terminal ends of both the tubes 68 and 70 open through the lower portion of the side wall 28. It will be appreciated that in addition to the support provided by the side wall 28, the tubes 68 and 70 may be provided additional support by conventional brackets or the like (not shown) in order to retain them in the position shown.

To provide a multi-stage distillation plant, the modules 10a–f are connected to each other such as by welding, bolting or the like and in tandem as shown in FIGS. 1, 2, and 4 of the drawings. To provide a continuous circuit for condensing fluid, a series of upper and lower intermediate water jackets or headers 72 and 74, respectively, are fixed over the terminal ends of the U-shaped tubes 68 and 70. In addition to the intermediate headers 72 and 74, the module 10a is provided with an upper outlet header 76 and a lower inlet header 78 while similar end headers 80 connected by a 180° fitting 82 are provided on the last module in the series 10f. The manner in which the various headers 72, 74, 76, 78 and 80 are attached is depicted in FIG. 5. The lower end header 78, like the remainder of the headers, is provided with a peripheral flange 83 having holes to receive bolts or studs (not shown) anchored in the side wall 28 of each module. Other methods of attachment, such as welding, may be used to effect the connection of the headers to the modules in water-tight fashion. Thus it will be appreciated that the U-shaped condenser tubes together with the headers 72, 74, 76, 78, and 80 establishing a continuous circuit or path for condenser fluid.

To provide for continuous brine flow through the flash chambers 12 and 14 of the respective modules 10a–f in operation, the first module 10a is provided with an inlet nipple 84 opening to the flash chamber 12 therein while the flash chamber 14 in the module 10a is fitted with an outlet nipple 86. A header 88 across the end wall of the module 10f effects a flow path between the flash chamber 12 in the module 10f and the flash chamber 14 therein.

In the operation of the embodiment illustrated in FIGS. 1–5 of the drawings, relatively cool sea water at ambient temperature is introduced into the end header 78 and passed successively through the condenser tubes 70 in the lower condenser chambers 18. Then, after passing through the 180° fitting 82, the sea water is passed successively through the upper condenser chambers 16 and out of the end header 76. Assuming continuous operation in accordance with well-known principles of distillation, the sea water passing out of the header 76, after having picked up heat, is passed through a brine heater (not shown) and then back into the flash chamber 12 of the module 10a through the nipple 84. In accordance with conventional practice, the successive flash chambers, which in this embodiment constitute the flash chambers 12 proceeding from the module 10a through the module 10f and then the flash chambers 14 proceeding from the module 10f back to the module 10a, are held at successively lower pressures so that as the brine, passing through the respective ports 58 and upwardly through the evaginated venturi nozzles 50, is flashed into a vapor fraction. The vapor fractions from the flash chambers 12 pass, upwardly through the demister screens 46 and then downwardly through the ducts 20 into the respective condenser chambers 16 from which distillate is removed through the distillate trough 64. In similar fashion, the vapor fractions from the flash chambers 14 in each module are passed upwardly through the demister screens 48, then downwardly through the ducts 22 into the lower condenser chambers 18. In this manner, a true counter-flow relationship between brine and condenser flow through the plant is established. In other words, the vapors produced in the flash chamber 12 of the module 10a, developed at the highest temperature and pressure, are brought into contact with the condenser fluid or sea water, which at this point is at its highest temperature in the plant. Conversely, vapors developed at the lowest pressure and temperature in the flash chamber 14 of the module 10a are condensed by contact with the heat exchange elements at a point in the system where the condenser fluid is at its lowest temperature. Thus it will be appreciated that optimum conditions of thermal equilibrium are enabled in spite of the module construction of the plant. Also it will be noted that in the aforementioned embodiment, the only walls with which corrosive brine makes contact are the side walls 42 and 44, intermediate dividing wall 38, and the flash chamber floor 40. A non-corrosive vapor shield, on the other hand, separates the brine from the outer walls 28, 30, and 32. Since these latter walls provide the major amount of strength needed to achieve the differential pressures between the respective flash chambers, they may be formed of relatively inexpensive carbon steel leaving only those walls with which the sea water comes into contact to be formed with high cost copper-nickel alloys required to resist corrosion.

The respective alternative embodiments illustrated in FIGS. 6 to 14 of the drawings demonstrate that the basic module construction illustrated in FIGS. 1 to 5, and described above, can be modified in various ways to accommodate different structural arrangements without departing significantly from the basic mode of operation.

Hence, in the embodiment of FIGS. 6 and 7, a plurality of successive modules 90, each having a dome-shaped flash chamber 92 with an evaginated venturi nozzle 94, are arranged to effect a series zig-zag or sinusoidal flow of brine between the respective flash chambers. Each module, in this instance, includes only one flash chamber having an interior wall 96 along the side thereof adjacent to the nozzles 94 to define a vapor duct 98 communicating with a single condenser chamber 100. The condenser chamber in this embodiment, includes a series of straight tubes 102 supported by and opening through a pair of plates 104, one on each side of the modules 90. Water jackets or headers 106 on each side of the modules connect the condenser tubes 102 of one module with the condenser tubes 102 of the next successive module to effect a sinusoidal counter-flow of condenser fluids through the tubes 102 with respect to brine flow through the flash chambers 92. Also, the condenser chamber is provided with a pair of horizontal baffles 108 to assure complete contact of vapors passing from the flash chamber 92, and through the duct 98 with the respective condenser tubes 102. A distillate trough or discharge conduit 110 is provided to remove the distillate product. Also, in this instance, a vent pipe 112 is shown opening to the condenser chamber of each module in order to maintain the pressure differential between successive stages in accordance with well-known practice.

The embodiment of FIGS. 8 and 9 is similar to the embodiment of FIGS. 6 and 7 except that in this instance, each of a series of modules 114 are provided, each with two flash chambers 116 separated by a longitudinal division plate 117 and two condenser chambers 118 separated by a central transverse wall 119. Vapor pipes 120 connect the flash chambers with the condenser chambers in such a manner that the brine-condenser fluid counter-flow relationship referred to above is maintained.

The embodiment of FIGS. 10 and 11 and embodiment of FIGS. 12 to 14 are similar to one another in that in both of these embodiments, brine flow is in a longitudinal direction of each module, while condenser fluid flow is sinusoidal as in the prior embodiments. In the embodiment of FIGS. 10 and 11, a series of modules 122 are provided each having a flash chamber extending from one side wall 124 to the other side wall 126, thereof. Also, an evaginated venturi nozzle including an inclined wall 128 extends transversely between the side wall 124 and an interior wall 130 spaced from the wall 126 to establish a vapor duct 132. An elongated aperture 134 enables brine to flow through the successive flash chambers of the modules 122 when they are assembled in tandem as shown in FIG. 10. The duct 132 is in communication with a condenser chamber 136, which in this instance, carries a plurality of U-shaped condenser tubes 138 supported from vertically disposed baffle plates 140. As in the previous embodiments, a sinusoidal path for condensing fluid is established by headers 142 interconnecting the free ends of the condenser tube legs. A distillate trough 144 is provided for collecting condensed vapors after they have contacted the tubes 138.

The embodiment of FIGS. 12 to 14 as aforementioned, is similar to the embodiment of FIGS. 10 and 11 though in this instance, a pair of vapor ducts 146 are provided, one to each side of the respective modules. The condenser chamber, designated by the reference numeral 148, in this embodiment is similar to the embodiment of FIGS. 6 and 7 so that further discussion thereof is deemed unnecessary. It will be noted from FIG. 13 that the complete exterior casing of each module in this embodiment is isolated from brine which is constrained to flow between a pair of interior side walls 150, by virtue of the ducts 146 on each side of the module. Accordingly, the entire outer casing of the module in this embodiment may be formed of low cost carbon steel leaving only the walls 150 and the flash chamber floor 152 to be formed of relatively expensive corrosive resistant metal such as copper-nickel alloys.

Thus it will be appreciated that by this invention an improved module construction for flash distillation plants is provided by which the above mentioned objects are completely fulfilled. Further it has been demonstrated that various modifications of the basic module design might be employed depending on the precise needs of a particular installation. Since, therefore, various modifications of the present invention are contemplated, it is expressly intended that the foregoing description is illustrative of preferred embodiments only, not limited, and that the true spirit and scope of this invention is to be determined by reference to the appended claims.

The invention claimed is:

1. A multi-stage flash distillation plant comprising: a plurality of distinct modular units connected in tandem, each of said units including bottom and side walls defining a flash chamber, a central wall dividing said chamber into two horizontally disposed flash chambers to receive a feed solution to be separated into a vapor fraction and a liquid fraction; means comprising a horizontal division plate extending between the side walls of each unit and defining at least one horizontally disposed condensing chamber having a plurality of heat exchange elements for bringing a relatively cool condensing fluid into heat exchange relation with said vapor fraction to cool and condense said vapor fraction, said flash chamber defining means being positioned above and supported on said condensing chamber defining means; vapor duct means vertically disposed within said unit for connecting at least said one flash chamber with at least said one condensing chamber respectively, means to pass the residual liquid fraction of one flash chamber to a successive flash chamber; and means to connect the heat exchange elements of successive modular units to enable the passage of condensing fluid through said elements to counter-flow relation to the passage of feed solution through said flash chambers.

2. The apparatus recited in claim 1 in which each of said modular units comprises an exterior shell and said vapor duct means extends between said shell and said flash chambers to provide a non-corrosive vapor shield at least partially about said flash chamber.

3. The apparatus recited in claim 1 in which said liquid fraction passing means are positioned alternately on opposite sides of successive modular units to effect a zig-zag series flow.

4. The apparatus recited in claim 1 in which said central wall of each of said modular units comprises a vertical partition longitudinally disposed in the upper portion thereof to establish a pair of interconnected successive flash chambers, and said division plate comprises a transverse partition in the lower portion thereof to establish a pair of condenser chambers, and said vapor duct means interconnects said flash chambers respectively to said condenser chambers to enable condensing fluid to be passed through said heat exchange elements in counter-flow relation to the passage of said liquid fraction through said flash chambers.

5. A modular unit for multi-stage distillation plants comprising: an exterior shell having top, bottom and side walls and at least one end wall; means including a floor wall and a pair of interior side walls extending the length of said shell to define a flash chamber, a central wall dividing said chamber into two flash chambers, said interior side walls being spaced from the side walls of said shell and terminating short of said top wall; said floor and said bottom wall defining a condenser chamber below said flash chamber, means in said end wall for introducing a feed solution into the lower portion of said flash chamber, said spaced shell and interior side walls establishing vapor ducts therebetween and extending between the upper portion of said flash chamber and said condenser chamber thereby to provide a vapor shield between said shell and feed solution in said flash chamber.

6. A plurality of modular units as defined in claim 5 arranged in tandem including means interconnecting the evaporating spaces for serially passing the feed solution from the outlet means of one to the inlet means of the next axially succeeding one and means for interconnecting said condensing means within said condensing spaces so as to define a continuous flow path between axially connected units.

7. The apparatus according to claim 6 including means for directing flow of the condensing means in counter-relationship to the flow of feed solution.

8. The apparatus recited in claim 6 wherein said central wall comprises a vertical partition longitudinally within said flash chamber defining a second flash chamber therein, a further horizontal partition in said condenser chamber defining a second condenser chamber vertically of said aforementioned condenser chamber, and a second vapor duct means for interconnecting said second flash chamber and said second condensing chamber.

References Cited
UNITED STATES PATENTS

| | | | |
|---|---|---|---|
| 1,232,269 | 7/1917 | Forbes | 203—11 |
| 2,078,377 | 4/1937 | Fox et al. | 202—174 |
| 3,096,256 | 7/1963 | Worthen et al. | 202—172 |
| 3,214,350 | 10/1965 | Lichtenstein | 202—173 X |
| 3,228,859 | 1/1966 | Frankel et al. | 202—173 |
| 3,304,242 | 2/1967 | Lockman | 202—173 |
| 3,322,648 | 5/1967 | Kays et al. | 202—174 |
| 3,326,280 | 6/1967 | Bosquain et al. | 202—173 X |
| 3,330,739 | 7/1967 | Roe et al. | 202—173 |
| 3,216,910 | 11/1965 | Langer et al. | 203—11 X |
| 3,219,553 | 10/1965 | Hughes | 202—173 |

NORMAN YUDKOFF, Primary Examiner

F. E. DRUMMOND, Assistant Examiner

U.S. Cl. X.R.

203—11, 88